United States Patent [19] [11] 3,933,702
Caimi et al. [45] Jan. 20, 1976

[54] AQUEOUS RELEASE COATING COMPOSITIONS FOR PRESSURE SENSITIVE ADHESIVES

[75] Inventors: Ronald J. Caimi, Somerset; Walter F. Schlauch, Somerville, both of N.J.

[73] Assignee: National Starch and Chemical Corporation, Bridgewater, N.J.

[22] Filed: July 10, 1974

[21] Appl. No.: 487,159

[52] U.S. Cl.. 260/17 R; 260/29.2 M; 260/29.4 UA; 260/29.6 NR; 260/29.6 WA; 260/29.6 RB; 428/352
[51] Int. Cl.$^2$...................... C08L 1/28; C08L 43/04
[58] Field of Search .... 260/827, 29.4 UA, 29.6 NR, 260/17 R; 161/406

[56] References Cited
UNITED STATES PATENTS

| | | | |
|---|---|---|---|
| 2,494,329 | 1/1950 | Carlin | 260/827 |
| 3,301,809 | 1/1967 | Goldberg et al. | 260/29.4 UA |
| 3,788,941 | 1/1974 | Kupits | 161/406 |
| 3,796,786 | 3/1974 | Koch et al. | 161/406 |
| 3,798,193 | 3/1974 | Parekh et al. | 260/29.4 UA |

Primary Examiner—Murray Tillman
Assistant Examiner—A. H. Koeckert

[57] ABSTRACT

Release coating compositions for pressure sensitive adhesive articles, characterized by their excellent properties of remaining migration-free, without the use of an organic solvent, and, that of their ability to be readily separated from the adhesive layer without contaminating the same.

6 Claims, No Drawings

AQUEOUS RELEASE COATING COMPOSITIONS FOR PRESSURE SENSITIVE ADHESIVES

BACKGROUND OF THE INVENTION

This invention relates to release coating compositions for pressure sensitive adhesives. More particularly, this invention relates to thermosetting, resinous release coating compositions which do not employ organic solvents. Said compositions are characterized by their ability to provide for the rapid peeling of cover sheets from labels and the like and, for the rapid unwinding of tapes and other adhesive bearing materials in roll form.

As is known in the art, the use of pressure sensitive adhesives and, at times, that of non-pressure sensitive adhesives calls for the use of a release coating. In the case of the pressure sensitive materials, if tape, the release coating is applied to the side opposite to that to which the adhesive layer is affixed, or, if in sheet form whether label or bandaid or "contact paper" or the like, the release coating is applied to that side of the protective cover sheet which comes in contact with the adhesive layer.

Conventional release coating compositions are usually film forming substances or solutions essentially comprised of a solvent, a release agent, and, at times, one or more optional additives. Among the more prevalent conventional release coating compositions are included those which are essentially comprised of a thermosetting silicone resin dissolved in an organic solvent such as toluene or xylene or the like. Release coating compositions of this type have proven quite useful in providing for the rapid release of cover sheets of labels and the like and, for the easy unwinding of tapes and other adhesive bearing articles in rolled form. However, they often present problems such as fire hazards and pollution, due to the presence of the solvent, and, in particular, the transfer or migration of the silicone into the adhesive layer. This undesired occurrence of silicone migration, which usually happens during storage of the coated product, is especially evidenced by a significant decrease in adhesive strength, due to the contamination of the adhesive layer.

Heretofore various efforts have been put forth to overcome the silicone migration problem. For example, a well known method is to first coat the cover sheet or interleave liner or the back side (non-adhesive bearing side) of the tape substrate with an anchor layer prior to applying the release coating. Another method is to use extremely low amounts of silicone and increased amounts of surfactants. Though such methods have proven to be somewhat successful, they are, in some respects, impractical or of limited usefulness. For instance, the use of an anchor layer presents an added cost factor and calls for the additional steps of preparation and coating. On the other hand, the use of too low an amount of the release agent, i.e., lubricant with increased amounts or surfactants, may result in inadequate or very poor separation from the adhesive layer and concomitant surfactant migration. For the foregoing reasons, there exists a need for a release coating composition which does not call for the use of an organic solvent and is capable of overcoming the inherent shortcomings of the prior art compositions.

SUMMARY OF THE INVENTION

Thus, it is the prime object of this invention to provide aqueous coating compositions which are useful as release coatings for pressure sensitive adhesives. It is a further object of this invention to provide release coating compositions which are characterized by their ability to be rapidly and cleanly separated from the adhesive layer. It is still a further object of this invention to provide an economic means for providing a release coating composition for pressure sensitive adhesives.

Various other objects and advantages of this invention will become apparent from the following description thereof.

We have now discovered that aqueous release coating compositions capable of overcoming the aforementioned problems can be prepared by incorporating a relase promoting compound into a thermally curable aqueous polymer system. More precisely, we have now found that aqueous release coating compositions comprising a film forming aqueous vinyl type polymer system which is capable of being crosslinked and a release promoting compound overcome the aforementioned problems of silicone migration and the concomitant reduction in the effectiveness of the adhesive. The films derived from these emulsions are free from grit and are readily crosslinked upon being heated. The resulting essentially surfactant-free and solvent-free films are rigid and are not prone to cold flow. In addition, the crosslinked films are particularly outstanding in regard to their ability to provide for the rapid release and easy unwinding of materials bearing pressure sensitive adhesives.

In brief, the novel aqueous release coating compositions of our invention essentially consist of two components, a hydrocolloid stabilized-aqueous emulsion of a crosslinkablevinyl type polymer and a release promoting compound; it being essential in the preparation of our compositions to make use of the hydrocolloid as the main emulsifier or protective colloid. In a varied aspect in the preparation of the polymers useful in the practice of this invention, a crosslinkable comonomer may be incorporated in the polymerizable mixture or a thermosetting resin may be subsequently admixed with the latex and the release promoting compound as described hereinafter.

DESCRIPTION OF THE PREFERRED EMBODIMENTS

In accordance with this invention, the novel aqueous release coating compositions are prepared by admixing the latex and the release promoting compound in an amount of from about 0.5 to about 20 per cent, by weight, of the total solids contained in the latex. The mixing process is ordinarily carried out at ambient temperature, except when the release promoting compound is added, at any time, during the polymerization of the monomeric system which is utilized to form the latex. In the instance of such a varied method of preparation, wherein the monomeric system also contains a crosslinkable comonomer, the complete composition is obtained when polymerization is completed.

Polymers which may be used in the process of our invention include vinyl acetate homopolymers; copolymers of vinyl acetate with any ethylenically unsaturated comonomer such as, for example, the copolymers containing vinyl acetate in combination with alkyl esters of alpha-unsaturated carboxylic acids, having from 2 to 18 carbon atoms in the alkyl group, e.g. methyl acrylate, methyl methacrylate, ethyl acrylate, ethyl methacrylate, butyl acrylate, etc.; copolymers of vinyl acetate with dialkyl esters of alpha-unsaturated dicarboxylic acids, e.g. maleic, fumaric, and itaconic acids, wherein the alkyl groups contain from 1 to 8 carbon atoms; copolymers of vinylacetate and ethylene; copolymers of styrene and alkyl acrylates wherein the alkyl groups contain from 1 to 18 carbon atoms; copolymers of vinyl chloride and vinyl acetate or alkyl acrylates and three component interpolymers of vinyl acetate, an alkyl ester of alpha-unsaturated carboxylic acid, and an alpha-unsaturated carboxylic acid; copolymers of vinylidene chloride and vinyl chloride or an alkyl ($C_1$–$C_{18}$) acrylate or methacrylate.

The monomer phase used in preparing the vinyl acetate homo- or copolymer latices of this invention may comprise between 10 and 100 per cent, by weight, of vinyl acetate. The monomer phase used in preparing the styrene and alkyl acrylate copolymer latices useful in the practice of this invention may comprise between 20 and 65 per cent, by weight, of styrene. In the instance of the vinyl acetate based polymers, the remaining portion of the monomer phase may comprise from 0 to 90 per cent, by weight, of one or more ethylenically unsaturated comonomers, and optionally, a crosslinkable comonomer. In the instance of the styrene based polymer, the remaining portion may comprise, in addition to the alkyl acrylate, between 0 and 5.0 per cent, by weight, of a crosslinkable comonomer.

As mentioned above, the monomer phases herein may also contain a crosslinkable comonomer capable of undergoing further reaction after the latex is applied. Suitable materials include acrylamide, the N-alkylol, alkyl, and alkylether derivatives of acrylamide wherein the alkyl groups contain from 1 to 8 carbon atoms; hydroxypropyl (ethyl) acrylate and methacrylate, glycidyl acrylate, methacrylate, and alpha ether generally unsaturated carboxy compound, etc. An example of a monomer phase in which a crosslinkable comonomer is employed would be that of vinyl acetate and N-methylol acrylamide. Such a copolymer will ordinarily be prepared so as to contain from about 84 per cent to about 99.5 per cent, by weight, of vinyl acetate and from about 16 per cent to about 0.5 per cent, by weight, of N-methylol acrylamide. These copolymer emulsions may be crosslinked, i.e., cured, when heated or, when acid catalyzed.

Although our vinyl acetate: N-methylol acrylamide copolymers will ordinarily comprise the reaction product of the two respective comonomers polymerized at a particular ratio within the range mentioned above, it is preferred that these copolymers should contain from about 6 per cent to about 2 per cent, by weight, of N-methylol acrylamide. It should also be noted that although the use of minor amounts of other comonomers, such as acrylates, maleates, fumarates, and various vinyl esters, etc. are not to be excluded from the useful copolymer emulsions, we prefer, however, to restrict ourselves to the exclusive use of vinyl acetate as the comonomer for the N-methylol acrylamide.

In actually preparing these polymers, the practitioner may employ any of the aqueous emulsion polymerization techniques well known to those skilled in the art. These techniques generally involve the reaction of an aqueous emulsion of the respective monomers in the presence of a free radical type catalyst and, at times, other functional ingredients with the added provision, as necessitated by the process of our invention. Although various other colloids such as hydroethyl cellulose, polymethylvinyl ether of maleic anhydride, polyacrylamide and the like may be used, it is preferred that polyvinyl alcohol is employed as the sole emulsifying agent. Non-volatile buffers or salts are preferably omitted so as to eliminate the presence of any fixed basic salts which would ordinarily retard the crosslinking of the resulting polymers.

Since it is necessary that the polymers useful in the practice of this invention be capable of forming a film within the temperature range within which they are dried, the glass transition temperature (Tg C°) is an important property. For the purposes of this invention, it is required that the useful polymers display a Tg C° which is greater than 0°C., but less than 60°C. Tg C° is a measure of a polymer's softness or hardness, wherein higher temperatures indicate a harder polymer, and lower temperatures indicate a softer polymer. This conventional criterion of polymer hardness or softness is described by Flory in "Principles of Polymer Chemistry," pp. 56 and 57 (1953), Cornell University Press.

In a varied aspect of this invention, wherein the monomeric composition of the latex does not contain a self crosslinking comonomer, a thermosetting resin may be incorporated in the latex and release agent mixture. Among the resins useful for this purpose are included: urea-formaldehyde, melamine formaldehyde, alkyd resins, etc. Said thermosetting resins are preferably applied in the form of solutions.

The second essential component required for the preparation of the novel compositions disclosed herein is the release promoting compound.

Among the release agents useful in the practice of this invention are included the organosilicone compounds such as:

1. the dimethyl polysiloxanes of which our analyses indicated the structure to be best represented by the following general formula:

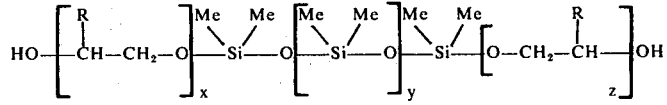

wherein R may be hydrogen or an aryl group or a higher alkyl group having from 1 to 20 carbon atoms or an alkyl substituted aryl group; and x, y, and z are integers ranging from 1 to 4. Such compounds are often made commerically available as easily emulsified fluids which have viscosities ranging from about 7.0 to about 60,000 cps at 25°C. Examples of such products are the L-522 and L-45 silicone fluids manufactured by Union Carbide Corporation;

2. the chemically reactive, water-soluble, Werner-type complexes in which a chromium nucleous is coordinated with a fatty acid, such as those compounds represented by the following general structural formula:

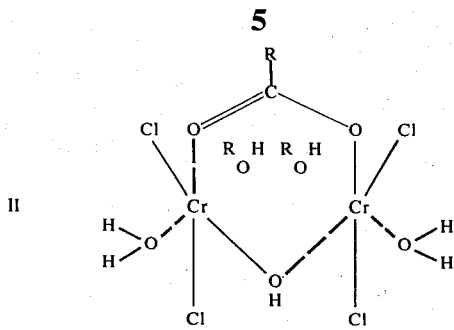

II wherein R represents a fatty acid group, having at least 12 carbon atoms. Examples of such compounds are chromium stearato chloride and the various other compounds sold commercially in alcoholic solution by the E.I. DuPont de Nemours & Co. under the trade "Quilon";

3. the water-soluble, fluorocarbon-Werner complexes which contain a nonpolar head portion which contains a sulfonamido group and are represented by the following general structural formula:

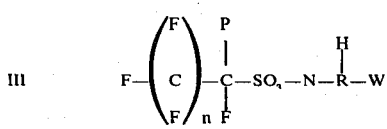

III wherein n is from 4 to 15; R is a divalent alkyl group having from 1 to 5 carbon atoms, and W is an active hydrogen-reactive Werner complex in which a chromium nucleous is coordinated with a carboxylic acido group. Though the exact structure of said Werner complex is not known with certainty, it is believed to be best represented by the following formula:

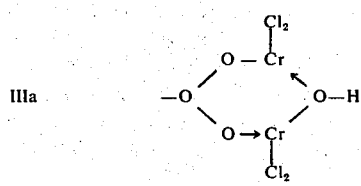

IIIa

Examples of the compounds defined by the foregoing general structures are the FC-805, a water soluble fluorochemical. The commercially available water dispersible fluorochemical resin emulsion, FC808, is also useful. Both of these are products of the Minnesota Mining and Manufacturing Company.

4. The organofunctional silicones such as silicone polycarbinol, mercapto silicone, carboxy silicone, chloroalkyl silicone, vinyl silicone, and such other compounds are also useful. The structures of such compounds are represented by either of the following two basic formulas:

IV(a) an ABA type such as 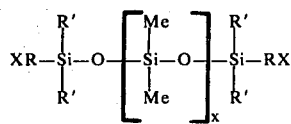

IV(b) a graft polymer type such as

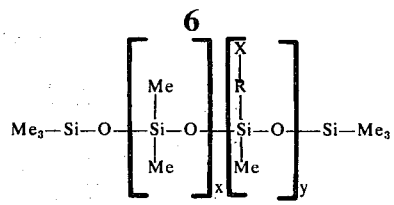

wherein R is an organic spacer, R' is an alkyl or an alkoxy group, and X is an organic reactive group including: alcohol, mercaptan, amine, carboxylic acid chloroalkyl and vinyl. Examples of the compounds defined by either of the two foregoing structural formulas are the silicone fluid products of the Dow Corning Corporation.

In the practice of this invention, it is preferred that a dimethyl polysiloxane, having a structure similar to that defined by Structure I, hereinabove, be used as the release promoting compound. It is also preferred that said compound be utilized with a vinyl acetate: N-methylol acrylamide copolymer, in an amount ranging from about 0.5 to about 10 per cent, by weight of the solids contained in said copolymer emulsion. Said copolymer is to preferably contain from about 6 to about 2 per cent, by weight, of N-methylolacrylamide.

The release coating compositions of this invention should be formulated, blended, applied, and cured so as to ensure their rapid, smooth separation from the adhesive layer. As previously mentioned, the release promoting material is blended with the film forming latex, at a concentration within the prescribed range. The thoroughly blended coating composition is first applied to either the back side (non-adhesive bearing side) of a tape substrate or to the face side of a cover sheet which is placed in face to face contact with the adhesive layer and, then dried and cured.

If desired, conventional non-chemically functional additives may be incorporated into the novel release coating compositions of this invention. Among these additives may be included: fillers such as finely ground polymer resins; pigments such as titanium dioxide, barium sulphate and the like; and dyes, preferably transparent, such as Brilliant Violet B, Fast Red 8 BLX, etc.

In using the novel aqueous release coating compositions to protect the adhesive layer of masking or adhesive tape or a pressure sensitive adhesive bearing article in sheet form such as a label or decal, etc., said compositions may be applied to their respective substrates by means of any conventional coating technique. Since the adaptability of a suitable method of coating, not withstanding the viscosity of the composition, will depend, to some extent, on the shape or form of the substrate, selection of a particular technique is left to the practitioner. Thus, the novel release coating compositions may be sprayed onto a selected substrate or they may be applied by use of any mechanical coating method such as air knife, trailing blade, knife coater, reverse roll, etc.

The release coating compositions of this invention may usually be coated at ambient or room temperature, i.e., 20°C. The practitioner may desire to adjust the viscosity of a particular composition to facilitate coating. The specific method selected for this purpose and the feasibility thereof will depend considerably on the rheological properties of the composition. The present aqueous release coating compositions are generally applied at coating weights ranging from about 4 to about 12 pounds, preferably from about 7.5 to about 8.5 pounds per ream (3000 square feet). In general, the coating weights at which these compositions will be applied will, of course, vary according to, inter alia, the composition utilized.

Our release compositions may be coated onto a virtually unlimited variety of substrates, including paper, cloth, paperboard, metal sheets and foils, foamed plastics, rubber, cellophane, and plastic films and sheets such as those derived from polyethylene terephthalate, polystyrene, rubber hydrochloride, polyvinyl chloride, and any other substance where there is sufficient adhesion to the coated film. Moreover, these novel release coating compositions may be utilized with any conventional pressure sensitive adhesives. Such adhesives usually, essentially consist of a film forming elastomeric material which may be natural or synthetic such as a polymer of butadiene or isobutylene or isoprene and the like or a polyvinyl ether ($C_1$–$C_4$) or a copolymer of styrene and butadiene or acrylonitrile and butadiene, or copolymers of acrylates and polyacrylates and other synthetic, or natural rubbers, etc.; and a tackifying material such as a hydrocarbon resin or a rosin ester or the like.

Subsequent to application, regardless of whether to a cover sheet or to the back side of a tape substrate, the film is dried and then cured by heating. The drying step is carried out by simply placing the coated substrate in oven set at a temperature from about 100°C., for a period of about 25–30 seconds. In order to cure (crosslink) the release coating compositions of this invention, it is merely necessary to expose the coated film to a temperature ranging from about 195°C. to about 210°C. over a period of about 1 minute. The practitioner will recognize that the selection of a specific heating temperature and the duration thereof will depend, for the most part, on the composition of the particular latex and the film thickness. Nevertheless, it is preferred that in those cases wherein a vinyl acetate: N-methylol acrylamide copolymer is utilized the heating process should be carried out at 105°C. over a period of approximately 30 seconds.

The following examples will further illustrate the embodiments of our invention. Unless specified otherwise, all amounts are given in terms of parts, by weight, on a dry basis.

EXAMPLE I

This example illustrates the preparation of a release coating composition and its usefulness on tape bearing a conventional, pressure sensitive adhesive layer. Said composition was prepared, using a polyvinyl acetate homopolymer, in combination with a commercially available thermosetting agent and a silicone release promoting compound. This example also illustrates the necessity of a crosslinking agent.

To make the above-described composition, 5 parts of L522 (a commercial polysiloxane product of the Union Carbide Corporation) and 1 part of "Uformite MM83" (a melamine formaldehyde resinous product of Rohm and Haas) were slowly admixed with 94 parts of a polyvinyl alcohol stabilized polyvinyl acetate homopolymer (weight percent solids) and 25.95 grams of water contained in a beaker. These ingredients were thoroughly stirred to ensure homogeneity. Thereafter portions of the resulting compositions and of two especially designed controls, A and B, were similarly coated onto the back sides of several strips of tape and tested for their release properties in the manners set forth hereinbelow.

Control A consisted of a blend of 95 parts of the above-described homopolymer, 5 parts of the above-described L522, and 25.95 grams of water. Control B merely consisted of the latex binder, namely the polyvinyl alcohol stabilized polyvinyl acetate homopolymer. The tests were conducted as follows:

A layer of the above-described test composition and layers of the two above-described controls were each applied to the non-adhesive sides of several 12 inch strips of standard masking tape by means of a wire-wound rod. All of the applications were made in such a manner so as to yield dry coating weights equivalent to that of about 8 pounds per 3000 square feet. The thusly coated strips were placed in an oven set at 105°C. for 30 seconds to remove any residual water therefrom and, then placed in an oven set about 204°C. for 1 minute.

The unwind adhesion properties of the dried and cured test sample composition and those of the now thoroughly dried control compositions were determined by employing the standard procedure outlined in PSTC-8, published by the Pressure Sensitive Tape Council and issued in September, 1955, and as revised in April, 1966. In accordance with this procedure, several 12 inch strips of the above-described masking tape were adhered to the surface of a stainless steel plate, and then a second strip of said masking tape was pressed directly over each of the first strips in a manner similar to the convolutions of rolled tape. The second strip, with its adhesive side down, was then mechanically delaminated by means of an Instron Testing Machine (Model No. T.T.C.) from that side of the first strip on which the release coating composition had been applied. Said machine measured the force required to remove the second strip from the first which remained adhered to the stainless steel plate. The results of the initial test and those similarly obtained after storage for 18 hours and also after 12 days at about 65.5°C. and about 95 percent relative humidity are presented hereinbelow in terms of psi (pounds per square inch).

The "180 Peel Adhesion" of the test composition was determined by employing the standard procedure outlined in PSTC-1, published by the Pressure Sensitive Tape Council and issued in September, 1955, and revised in April, 1966. In accordance with this procedure, a 5 by 1 inch portion of the specimen, adhesive side down, is applied to a polished stainless steel plate by means of a roller and thereafter mechanically pulled therefrom, at a uniform rate of 12 inches per minute by means of an Instron Testing Machine. Said stainless steel plate had been thoroughly cleaned by immersion in hot mineral spirits (Grade I of TT-T-291) and scrubbed with a clean absorbent material before and after immersions in boiling 95 percent methanol and in boiling absolute methanol. The test results of an initial test and those obtained after 18 hours and after 12 days, at 65.5°C. and at a relative humidity of about 95 percent, were recorded in terms of ounces per one (1) inch width to the nearest ounce. The results of this test and those of the unwind adhesion test are set forth below in Table No. 1.

Table No. 1

| Material Tested | Unwind Adhesion | | | 180° Peel Adhesion | | |
|---|---|---|---|---|---|---|
| | Initial | 18 Hour | 12 Days | Initial | 18 Hour | 12 Days |
| Control A | 0 | 0 | 0 | 0 | 0 | 0 |
| Control B | 0 | 0.60 | 0 | 0 | 9.6 | 0 |
| Test Sample | 0.12 | 0.38 | 0.42 | 28.0 | 24.0 | 23.2 |

The data summarized above clearly indicates that in order to obtain any measurable release properties at all, it is necessary that the latex binder be self-crosslinking or have a thermosetting resin incorporated therewith and, also that a release promoting compound be present. The absence of any release properties in all cases wherein the controls were tested, except those of the 18 hour testing of Control B, is reflected by the 0 results reported. Such results indicate that considerable tearing was encountered.

EXAMPLES II–V

These examples illustrate the preparations of a series of release compositions, using a polyvinyl acetate copolymer which contained a thermosetting resin, in combination with a varied amount of a silicone release promoting compound. It further illustrates the usefulness of said compositions as a release coating composition for the mastic layer of a pressure sensitive tape.

To make each of four sample compositions, II, III, IV, and V, a varied amount of a silicone release promoting compound similar to that employed in the test sample of Example I was slowly stirred into a reciprocal amount of a vinyl acetate: N-methylol acrylamide copolymer emulsion required to make 100 parts, by weight, of the particular composition. The copolymer emulsion utilized herein was similar to and prepared in the same manner as that disclosed in Example 1 of assignee's U.S. Pat. No. 3,301,809. Portions of each of the above-described test sample compositions and of an appropriate control were processed and thereafter tested for their release properties by the methods respectively outlined therefor in Example 1, hereinabove. Said control consisted of merely the vinyl acetate: N-methylolacrylamide copolymer emulsion utilized as the binder in each of the test sample compositions. The respectively varied amounts of L522 polysiloxane and the corresponding test results are set forth in Table No. 2 below.

Table No. 2

| Material Tested | Amount of L522 | Unwind Adhesion | | | 180° Peel Adhesion | | |
|---|---|---|---|---|---|---|---|
| | | Initial | 18 Hour | 12 Days | Initial | 18 Hour | 12 Days |
| Control | — | 0 | 0 | 0 | 0 | 0 | 0 |
| Sample II | 0.5 | 0.17 | 0.42 | 0.30 | 21.0 | 24.0 | 23.2 |
| Sample III | 2.0 | 1.05 | 1.25 | 1.60 | 21.0 | 19.0 | 22.0 |
| Sample IV | 5.0 | 1.05 | — | 1.50 | 32.0 | — | 28.0 |
| Sample V | 10.0 | 0.75 | — | 0.85 | 32.0 | — | 37.0 |

The data presented above clearly shows the wide range in which the concentration of the release promoting compound can be varied in the preparation of the novel aqueous release coating compositions of this invention. Again, the omission of a release promoting compound in the control resulted in tearing in all cases.

EXAMPLE VI

This example illustrates the preparation of a release coating composition, using a polyvinyl acetate copolymer in combination with a chemically reactive, watersoluble, Werner-type complex such as that defined hereinabove by general structural formula II.

The procedural steps outlined in Examples II–V, for the preparation of the test samples were repeated, except herein 0.5 parts of Quilon C, a commercial product of the DuPont Company was utilized as the release promoting compound. When portions of the resulting composition were coated, dried, cured, and tested in the manners respectively set forth in Example I, the following results were obtained:

| Unwind Adhesion | | | 180° Peel Adhesion | | |
|---|---|---|---|---|---|
| Initial | 18 Hour | 12 Days | Initial | 18 Hour | 12 Days |
| 1.85 | 1.7 | 2.8 | 56 | 50 | 50 |

The outstanding release properties of this composition are reflected by the test results presented above.

EXAMPLE VII

This example illustrates the usefulness of a relatively greater amount of a chemically reactive, Werner-type complex in the preparation of a release coating composition.

The procedural steps outlined in Examples II–V, for the preparations of the test samples, were again repeated, except herein 10 parts of Quilon C was utilized as the release promoting compound. When this composition was similarly processed and tested as were the preceding test samples, the test results, except those obtained after 12 days storage, were comparable to those of the test sample in Example VII. In the latter instances of both the Unwind Adhesion and the 180° Peel Adhesion tests, considerable brittleness was encountered. This phenomena merely indicated an excess of the release promoting compound in this particular composition.

EXAMPLE VIII

This example illustrates the usefulness of a watersoluble fluorochemical in the preparation of a release coating composition, in accordance with this invention.

The procedural steps outlined in Example VI were again repeated, except herein 1 parts of FC805, a commercial, water-soluble fluorochemical manufactured by the Minnesota Mining and Manufacturing Co., was added to 99 parts of the vinyl acetate and N-methylol acrylamide copolymer emulsion. Upon being processed and tested in the respective manners set forth in Example I, the resulting cured composition displayed the following release properties:

| Unwind Adhesion | | | 180° Peel Adhesion | | |
|---|---|---|---|---|---|
| Initial | 18 Hour | 12 Days | Initial | 18 Hour | 12 Days |
| 0.65 | 1.27 | 1.20 | 20 | 19 | 21 |

As clearly indicated by the data presented above, the water soluble, fluorocarbon-Werner complexes such as those defined by general structural formulas III and IIIa, are quite useful in the practice of this invention. The usefulness of such compounds was further illustrated, when comparable results were similarly obtained by testing a cured composition which comprised 3 parts of "FC805" and 97 parts of the vinyl acetate and N-methylol acrylamide copolymer emulsion.

EXAMPLE IX

This example illustrates the preparation of a release coating composition, using a polyvinyl acetate copolymer which contained a thermosetting agent, in combination with a silicone release agent added during polymerization. It further illustrates the improved release and adhesion properties realized upon using said composition.

To make the above-described composition, 5 parts of a commercially available silicone fluid similar to that described in Example I, were slowly stirred into a polymerization reaction mixture which essentially consisted of the ingredients required to make 95 parts of a vinyl acetate (ViAc) and N-methylol acrylamide (NMA) copolymer emulsion in the manner taught in Example I of assignee's U.S. Pat. No. 3,301,809. When tested by the methods outlined in Parts II and III of Example I, the resulting cured composition showed the following release coating properties:

| Unwind Adhesion | | | 180° Peel Adhesion | | |
|---|---|---|---|---|---|
| Initial | 18 Hour | 12 Days | Initial | 18 Hour | 12 Days |
| 0.86 | 0.95 | 0.72 | 18 | 14 | 10 |

The data summarized above clearly indicates the usefulness of an in-situ method and the feasibility thereof in the preparation of the novel release coating compositions disclosed herein. As shown, the release properties of the resulting cured composition were comparable to those of the test samples of the preceding examples.

EXAMPLES X–XII

These examples illustrate the usefulness of various protective colloids in the preparations of the aqueous release coating compositions typical of this invention.

To make each of three sample compositions, X, XI, and XII, 2 parts of a silicone release promoting compound similar to that employed in Example I were slowly admixed with 98 parts of a vinyl acetate and N-methylol acrylamide copolymer which had been prepared in a manner similar to that taught in Example I of assignee's U.S. Pat. No. 3,301,809, using a particular hydrocolloid as a stabilizer in lieu of polyvinyl alcohol. Portions of each the thusly prepared sample compositions were processed and thereafter tested for their release properties by the methods respectively set forth in Example I. The particular hydrocolloid used in each composition and the corresponding test results are presented below in Table No. 3.

Table No. 3

| Material Tested | Hydro-colloid Used | Unwind Adhesion | | | 180 Peel Adhesion | | |
|---|---|---|---|---|---|---|---|
| | | Initial | 18 Hours | 12 Days | Initial | 18 Hours | 12 Days |
| Sample X | Hydroxyethyl cellulose | 1.4 | 0.4 | 0.15 | 34 | 24 | 31 |
| Sample XI | polymethyl vinyl ether of maleic anhydride | 0.08 | 0.35 | 0.13 | 31 | 26 | 24 |
| Sample XII | Polyacrylamide | 0.07 | 0.4 | 0.14 | 30 | 26 | 28 |

The data summarized above clearly indicates that various hydrocolloids can be utilized in the same manner as the polyvinyl alcohol as the main emulsifier or protective colloid of the latex binders of the aqueous release coating compositions of this invention. Furthermore, the data illustrates the ability of the coating compositions, prepared with latex binders containing a particular hydrocolloid, to display the desired release properties.

EXAMPLE X

This example illustrates the effectiveness of the present novel, aqueous release coating compositions, when applied at varied coating weights.

A release coating composition similar to that of Test Sample II in Examples II–V, hereinabove, was prepared, coated as varied coating weights, processed, and tested for release properties in the respective manners outlined in Example I. The coating weights were varied from 4 to 12 pounds per 3000 square foot ream. The results obtained upon testing the cured compositions are presented below in Table No. 4.

Table No. 4

| Coating Weight of Test Specimen (lbs./ream) | Unwind Adhesion | | | 180 Peel Adhesion | | |
|---|---|---|---|---|---|---|
| | Initial | 18 Hours | 2 Days | Initial | 18 Hours | 2 Days |
| 4 | 0.64 | 1.25 | 1.40 | 15.2 | 15.7 | 13.9 |
| 6 | 0.64 | 1.35 | 1.30 | 16.1 | 15.7 | 13.6 |
| 8 | 0.74 | 1.35 | 1.40 | 17.6 | 14.4 | 13.9 |
| 12 | 0.70 | 1.40 | 1.45 | 15.7 | 15.7 | 16.0 |

As indicated by the data, the outstanding release properties of the novel compositions disclosed herein are not appreciably altered by significant variations in coating weights. In fact, the data illustrates the consistent effectiveness of said compositions, despite the use of a relatively small amount of release promoting compound, as well as a significant variation in the coating weight.

Summarizing, it is, thus, seen that this invention discloses aqueous release coating compositions which, upon being cured, are capable of providing excellent release films for pressure sensitive adhesives. Said compositions are characterized by their ability to provide for the rapid and clean separation of the adhesive layer from the protective cover sheet or from the backside of convoluted tape. Furthermore, this invention provides an economic means for releasing pressure sensitive adhesives in a wide variety of applications wherein the use of such adhesives is called for. Variations in proportions, procedures, and materials may be made, without departing from the scope of this invention as defined by the following claims.

We claim:

1. A release coating composition suitable for use with pressure sensitive adhesives in rolled form comprising:
   A. a hydrocolloid stabilized aqueous emulsion of a film forming vinyl polymer having a $T_g$ of from 0° to 60°C. and selected from the group consisting of:
   i. a crosslinkable copolymer from at least one crosslinkable monomer with at least one member of the group consisting of vinyl acetate; vinyl acetate and at least one member selected from the group consisting of $C_2$-$C_{18}$ alkyl esters of acrylic and methacrylic acid, $C_1$-$C_8$ dialkyl esters of maleic, fumaric or itaconic acid, ethylene and vinyl chloride; styrene and at least one $C_2$-$C_{18}$ alkyl ester of acrylic or methacrylic acid; and vinyl chloride and at least one $C_2$-$C_{18}$ alkyl ester of acrylic or methacrylic acid; and
   ii. an emulsion polymer selected from the group consisting of vinyl acetate homopolymers; copolymers of vinyl acetate and at least one member selected from the group consisting of $C_2$-$C_{18}$ alkyl esters of acrylic and methacrylic acid, $C_1$-$C_{18}$ dialkyl esters of maleic, fumaric or itaconic acid, ethylene and vinyl chloride; copolymers of styrene and at least one $C_2$-$C_{18}$ alkyl ester of acrylic and methacrylic acid; and copolymers of vinyl chloride and at least one $C_2$-$C_{18}$ alkyl ester of acrylic and methacrylic acid; said emulsion polymer containing a thermosetting resin to effect crosslinking; and
   B. from about 0.5 to 20 percent by weight of the emulsion polymer solids, of a release promoting compound selected from the group consisting of:
   i. polysiloxanes of the general formula:

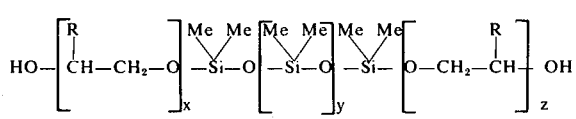

wherein R is H or an aryl, higher alkyl or alkyl substituted aryl group containing less than 20 carbon atoms, and x, y and z are integers ranging from 1 to 4; and
   ii. organofunctional silicones of one of the following general formulas:

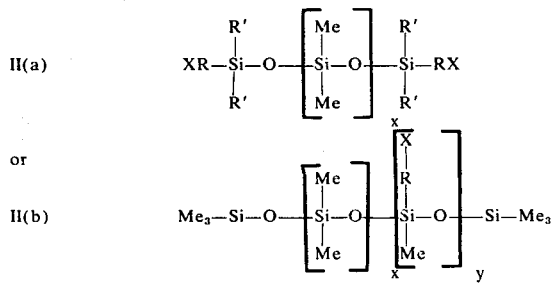

wherein R is an organic spacer other than alkyleneoxy or polyalkyleneoxy, R' is an alkyl or alkoxy group, X is a reactive member selected from the group consisting of hydroxy, mercapto, amino, carboxyl, chloroalkyl, and vinyl, and x and y are integers of from 1 to 4.

2. The composition of claim 1 wherein said vinyl polymer contains mers from a crosslinkable comonomer selected from the group consisting of N-methylolacrylamide, acrylamide, hydroxymethylated diacetone acrylamide, hydroxymethyl acrylate, hydroxymethyl methacrylate, hydroxyethyl acrylate, hydroxyethyl methacrylate, glycidyl acrylate and glycidyl methacrylate to effect crosslinking of said polymer.

3. The composition of claim 1 wherein said vinyl polymer contains 2 to 6 percent, by weight of the emulsion polymer solids, of urea-formaldehyde or melamine formaldehyde to effect crosslinking of said polymer.

4. The composition of claim 1 wherein the hydrocolloid stabilizer is selected from the group consisting of polyvinyl alcohol, hydroxyethyl cellulose, polymethyl vinyl ether of maleic anhydride and polyacrylamide.

5. The composition of claim 1 wherein said part B is present in an amount of 0.5 to 10 percent, by weight of the emulsion polymer solids.

6. The composition of claim 1 wherein said Part A is comprised of a polyvinyl alcohol stabilized vinyl acetate-n-methylolacrylamide copolymer, and said Part B is comprised of from 0.5 to 10 percent, by weight of the emulsion polymer solids, of a polysiloxane having a structure defined by formula I of claim 5 or an organofunctional silicone having a structure defined by formula II(a) or II(b) of claim 5.

* * * * *

UNITED STATES PATENT OFFICE  Page 1 of 3
CERTIFICATE OF CORRECTION

Patent No. 3,933,702          Dated Jan. 20, 1976

Inventor(s) Ronald J. Caimi, Walter F. Schlauch

It is certified that error appears in the above-identified patent and that said Letters Patent are hereby corrected as shown below:

Col. 1, line 62, the word "or" should read -- of --. Col. 3, line 38, the words "ether generally" should read -- ethylenically --. Col. 3, line 39, the word "compound" should read -- compounds --. Col. 4, line 50, insert the numeral -- I -- next to the formula; also in formula I, the "z" inside the bracket should be outside the bracket. Col. 4, line 65 and col. 5, line 36, the word "nucleous" should read -- nucleus --. Col. 5, Formula II, that portion of the formula reading

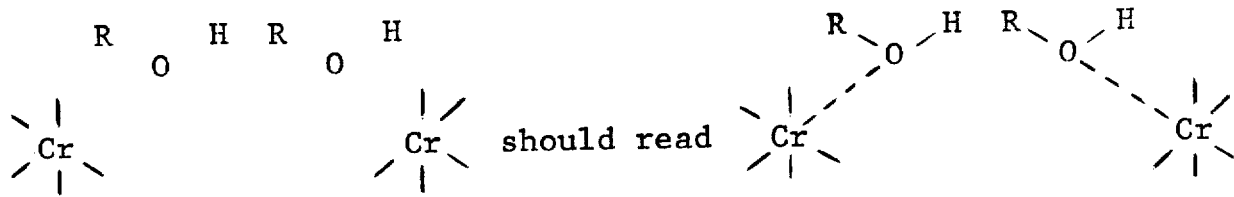

Col. 5, Formula III, that portion of the formula reading

UNITED STATES PATENT OFFICE
CERTIFICATE OF CORRECTION

Patent No. 3,933,702      Dated Jan. 20, 1976

Inventor(s) Ronald J. Caimi, Walter F. Schlauch

It is certified that error appears in the above-identified patent and that said Letters Patent are hereby corrected as shown below:

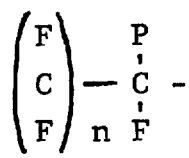     should read     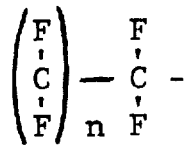

Col. 7, line 1, the word "Vary" should read -- vary --. Col. 7, line 60, the word "melamite" should read -- melamine --. Col. 8, line 59, the word "spirts" should read -- spirits --. Col. 10, line 47, the numeral "VII" should read -- VI --. Col. 10, lines 67-68, the word "watersoluble" should read -- water-soluble --. Col. 11, line 3, the word "parts" should read -- part --. Col. 14, Claim 1, line 12, insert the numeral -- I -- next to the first formula. Col. 14, Claim 6, line 58,

UNITED STATES PATENT OFFICE
CERTIFICATE OF CORRECTION

Patent No. 3,933,702　　　　　　　　　Dated　Jan. 20, 1976

Inventor(s)　Ronald J. Caimi, Walter F. Schlauch

It is certified that error appears in the above-identified patent and that said Letters Patent are hereby corrected as shown below:

the word "tate-n-methylolacrylamide" should read -- tate-N-methylolacrylamide --. Col. 14, Claim 6, lines 61 and 63, the numeral "5" should read -- 1 --.

Signed and Sealed this

Thirteenth Day of June 1978

[SEAL]

Attest:

RUTH C. MASON
*Attesting Officer*

DONALD W. BANNER
*Commissioner of Patents and Trademarks*